US008670549B2

(12) United States Patent
Williams

(10) Patent No.: US 8,670,549 B2
(45) Date of Patent: *Mar. 11, 2014

(54) METHOD AND SYSTEM FOR IMPROVED ROUTING OF REPAIR CALLS TO A CALL CENTER

(75) Inventor: Robin Williams, Jacksonville, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 472 days.

This patent is subject to a terminal disclaimer.

(21) Appl. No.: 12/434,348

(22) Filed: May 1, 2009

(65) Prior Publication Data

US 2009/0214021 A1    Aug. 27, 2009

Related U.S. Application Data

(63) Continuation of application No. 10/313,614, filed on Dec. 6, 2002.

(51) Int. Cl.
*H04M 3/00* (2006.01)
*H04M 5/00* (2006.01)

(52) U.S. Cl.
USPC .................................. 379/265.02; 379/266.01

(58) Field of Classification Search
USPC ............. 379/166.02, 221.05, 265.01–265.13, 379/266.01–266.03
See application file for complete search history.

(56) References Cited

U.S. PATENT DOCUMENTS

| 5,537,470 | A | * | 7/1996 | Lee | 379/265.11 |
| 5,646,987 | A | | 7/1997 | Gerber et al. | |
| 5,703,943 | A | * | 12/1997 | Otto | 379/265.11 |
| 5,923,745 | A | * | 7/1999 | Hurd | 379/265.02 |
| 6,055,513 | A | | 4/2000 | Katz et al. | |
| 6,456,698 | B1 | | 9/2002 | Morganstein et al. | |
| 6,724,884 | B2 | | 4/2004 | Jensen et al. | |
| 6,850,612 | B2 | * | 2/2005 | Johnson et al. | 379/265.02 |
| 6,956,941 | B1 | * | 10/2005 | Duncan et al. | 379/265.01 |
| 2003/0069848 | A1 | * | 4/2003 | Larson et al. | 705/50 |
| 2005/0033582 | A1 | * | 2/2005 | Gadd et al. | 704/277 |

* cited by examiner

*Primary Examiner* — Oleg Asanbayev
(74) *Attorney, Agent, or Firm* — Greenblum & Bernstein, P.L.C.

(57) ABSTRACT

Processing a communication received at a communications center over a communications network includes determining whether a sender of the communication sent previous communications to a communications center based on identification information obtained from the communication. Communication is routed to an agent, from a first group of agents, when it is determined that the sender did not send previous communications to the communications center. The communication is processed by generating a report by the agent from the first group of agents. Communication is routed to an agent, from a second group of agents, when it is determined that the sender sent send previous communications to the communications center. The communication is re-processed by retrieving an existing report by the agent from the second group of agents.

10 Claims, 5 Drawing Sheets

METHOD AND SYSTEM FOR IMPROVED ROUTING OF REPAIR CALLS TO A CALL CENTER

CROSS-REFERENCE TO RELATED APPLICATION

This is a continuation application of pending U.S. patent application Ser. No. 10/313,614, filed on Dec. 6, 2002, the disclosure of which is expressly incorporated herein by reference in its entirety.

FIELD OF INVENTION

This invention relates generally to the improved routing of repair calls within a repair call center for wireline telephone services.

BACKGROUND OF THE INVENTION

In wireline telecommunications networks, telecommunications service providers provide repair call centers for receiving and responding to telephone calls made by subscribers requesting repairs for telecommunications equipment and services. In a typical repair call center scenario, telephone calls are answered in order by customer service assistants (CSAs) who create reports of newly reported problems (i.e., trouble reports) for later referral to a technician for repair or provide status information regarding existing trouble reports. When the number of calls to the repair center exceeds the number of available customer service assistants, subsequent callers are put on hold in a queue until a customer service assistant becomes available to take a new call.

Often in repair call centers, calls requesting status information regarding existing trouble reports (repeat calls) take longer than calls reporting initial trouble reports (first time calls). The reason for this is that repeat calls often consist of a customer service assistant retrieving an existing trouble report for a subscriber, discussing the trouble report with the subscriber and, if the trouble report is not resolved to the subscriber's satisfaction, discussing the trouble report with a supervisor. While this process is going on, other subscribers waiting in the queue are kept on hold until the repeat call has ended. On the other hand, first time calls are generally shorter in duration requiring only a description of the problem by the subscriber and the creation of a trouble report by the customer service assistant. As a result, the wait time for callers to speak to a customer service assistant is often increased by the time taken by repeat callers ahead of them in the queue.

Accordingly, there is a need in the art for a method and system of improving the routing of repair calls to a call center to reduce the overall wait time of callers on hold in a queue.

It is with respect to these considerations and others that the present invention has been made.

SUMMARY OF THE INVENTION

In accordance with the present invention, the above and other problems are solved by a method and system for improved routing of repair calls to a call center.

A method and system are provided for improved routing of repair calls in a call center. A call routing system receives a repair call from a calling party and determines if the calling party is a first time caller or a repeat caller. If it is determined that the calling party is a first time caller, the repair call is routed to a first group of customer service assistants. If it is determined that the calling party is a repeat caller, the repair call is routed to a second group of customer service assistants.

In one embodiment, the determination of whether a calling party is a first time caller or a repeat caller includes receiving identification data associated with the calling party, identifying the identification data associated with the calling party, and querying a customer database for customer data matching the identification data associated with the calling party. If it is determined that the identification data does not match the customer data then the calling party is a first time caller. If it is determined that the identification data matches the customer data, then the calling party is a repeat caller. In another embodiment, the identification data is saved as new customer data in the customer database if it is determined that the calling party is a first time caller to the repair center.

In a further embodiment, after receiving a repair call from a calling party, the call routing system requests an input from the calling party, and routes the repair call based on the input. The input may be a predetermined key on a telephone keypad or a voice command from the calling party.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION OF THE ILLUSTRATIVE EMBODIMENTS

Figure 1:
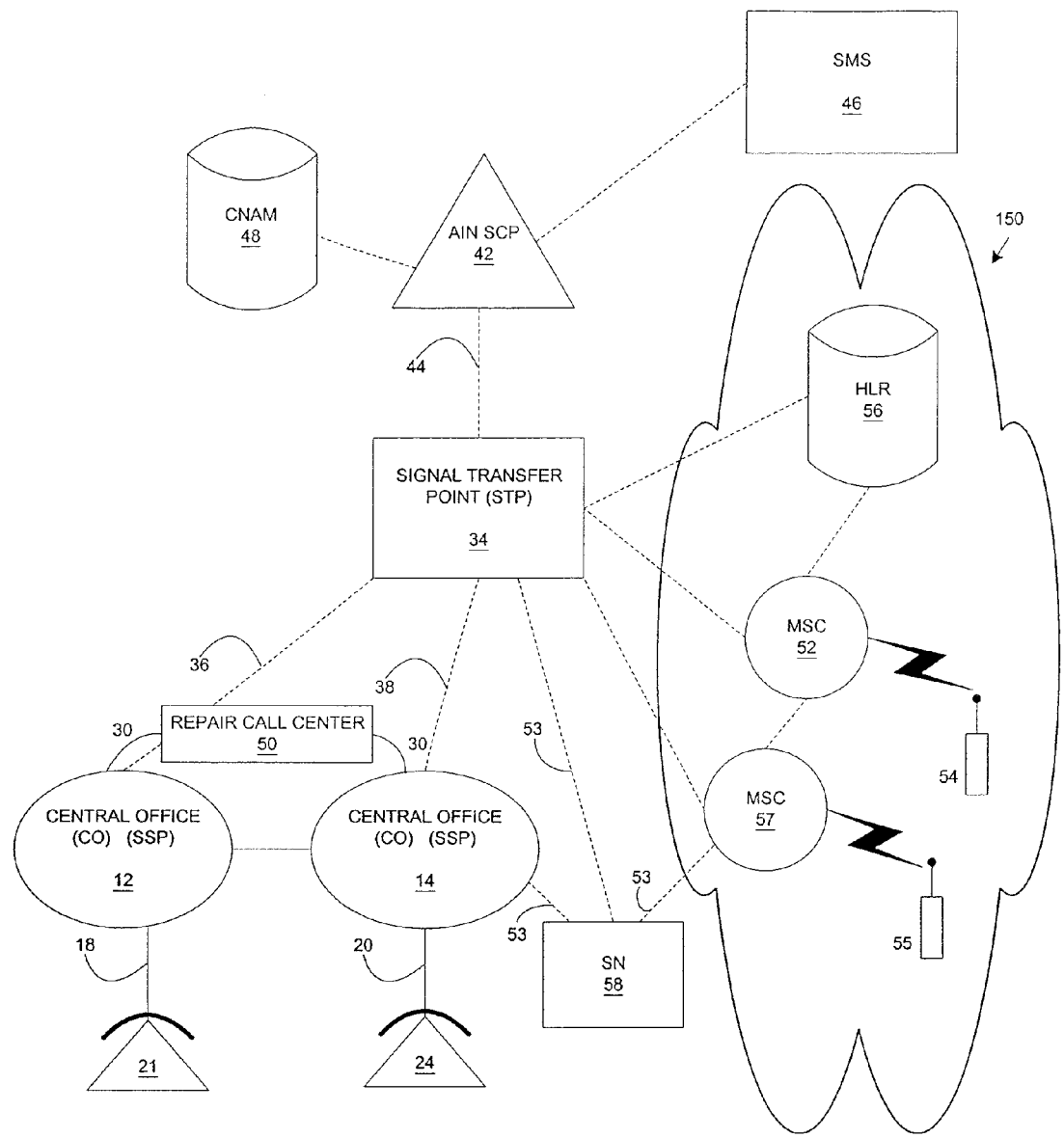
FIG. 1 is a block diagram illustrating components of a wireline and wireless telephone network that provides an exemplary operating environment for the present invention.

It is advantageous to describe an exemplary operating environment in which the current invention may reside to improve the routing of repair calls to a call center. FIG. 1 is a block diagram illustrating components of a wireline and wireless telephone network that provides an exemplary operating environment for the present invention. Referring now to the drawings, in which like numerals represent like elements throughout the several figures, aspects of the present invention and the advanced intelligent network (AIN) and an integrated wireless network will be described.

The public switched telephone network that evolved in the 1980s incorporated the advanced intelligent network (AIN). Some of the components of the advanced intelligent network are illustrated in FIG. 1. FIG. 1 is a block diagram representing at least a part of the advanced intelligent network (AIN) 100 of a typical local exchange carrier integrated with components of a wireless network 150. The advanced intelligent network (AIN) uses the signaling system 7 (SS7) network for signal or system control message transport. The components thereof are well-known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices are provided in a typical public switched telephone network. As shown in FIG. 1, each central office may include an electronic switch known to those skilled in the art as a service switching point (SSP). These are indicated in FIG. 1 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30.

As shown in FIG. 1, central offices switches (SSP) 12 and 14 have a plurality of subscriber lines 18 and 20 connected thereto. Each of the subscriber lines 18 and 20 is connected to a terminating piece or pieces of customer premises equipment that are represented by telephones 21 and 24. SSP switches 12 and 14 are connected by a plurality of trunk circuits 30. These are the voice path trunks that interconnect the central offices 12 and 14 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local AIN service control point (SCP) 42 that is connected to signal transfer point 34 via SS7 data link 44. As is known to those skilled in the art, AIN service control points, such as AIN SCP 42, are physically implemented by relatively powerful fault tolerant computers. Among the functions performed by the service control points is maintenance of network databases used in providing enhanced services.

Additional devices for implementing advanced network functions within the AIN 10 are provided by regional STPs (not shown), regional AIN SCPs (not shown), and a service management system (SMS) 46. The STP 34 is connected to the SSPs via connections 36, 38 and 40. Both the regional AIN SCPs and the local AIN SCP 42, which represent a plurality of local AIN SCPs distributed throughout the AIN 10, are connected via respective data links to the SMS 46. The SMS 46 provides a centralized platform for remotely programming the various AIN SCPs of the AIN 10 so that a coordinated information processing scheme may be implemented for the AIN 10. The SMS 46 is implemented by a large general purpose computer and interfaces to business offices of the local exchange carrier and interexchange carriers.

The AIN SCP 42 is also connected to a caller ID with name (CNAM) database 46. The CNAM database comprises a plurality of directory numbers along with associated names for the directory numbers. The CNAM database may be used to provide a look-up database to provide caller ID service. The CNAM database may comprise directory numbers from wireline customers as well as wireless customers of wireless network 150.

In operation, the intelligent network elements of the AIN 100, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12 and 14, a relatively small set of triggers are defined at the SSP central office switches for each call.

The wireless network 150, such as a cellular network, comprises a mobile switching center (MSC) 52. The MSC 52 is a switch providing services and coordination between wireless user in network 150 and external networks. The MSC 52 may be connected to STP 34 to provide information to the wireline network and receive information from the wireline network. The MSC 52 also communicates with a wireless subscriber, such as wireless telephones 54 and 55.

The MSC 52 may also be connected to a home location register (HLR) 56. The HLR is an SS7 database used to identify/verify a wireless subscriber. The HLR also comprises data related to feature and services the wireless subscriber has. The HLR is also used during roaming to verify the legitimacy of the subscriber and to provide them with their subscribed features. The HLR 56 may also be connected to the STP 34 and/or SCP 42 of the wireline network. In certain embodiments of the present invention, such as when the calling party is a wireless phone customer, the HLR may be used to provide the calling party's name and calling party's number for the caller ID service.

For responding to subscriber repair requests for customer premise equipment and services, telecommunications service providers provide a repair call center 50 for responding to subscriber inquiries. The repair call center 50 includes computer systems, customer databases, software, voice response units, and an interface for connection to the telephone network described with respect to FIG. 1. The repair call center 50 receives subscriber calls from the AIN network via trunk circuits 32 and 34 from SSP central office switches 12 and 14 respectively. Generally, a repair call center 50 is used to manage telephone calls from multiple subscribers, prepare trouble reports describing subscriber problems with customer premise equipment, and refer the trouble reports to technicians for repair. The trouble reports are prepared by a group of customer service assistants (CSAs) who receive information via telephone from subscribers describing problems with customer services or equipment. The trouble reports may include such information as the subscriber's name and telephone number, a description of the problem, and an estimated period for completing the repair. If all of the CSAs in the repair call center 50 are busy taking calls from other subscribers, subsequent calls are put on hold in a queue and routed to a CSA when one becomes available.

Figure 2:
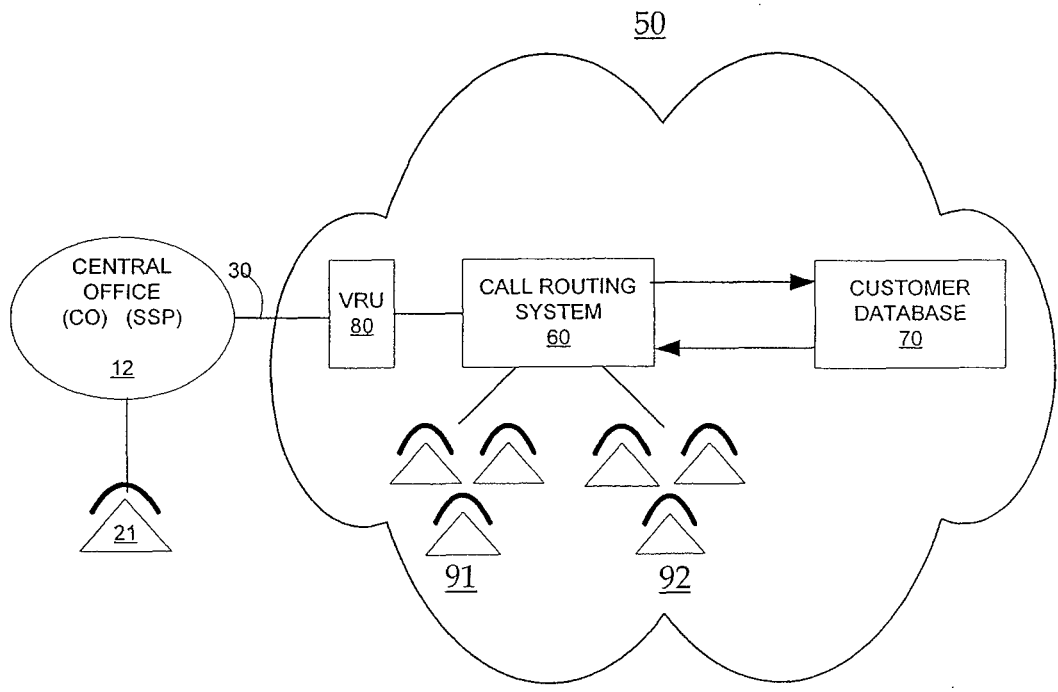
FIG. 2 is a block diagram illustrating the system architecture of an exemplary embodiment of the present invention.

FIG. 2 is a block diagram illustrating the system architecture of an exemplary embodiment of the present invention. As shown in FIG. 2, the repair call center 50 includes call routing system 60 for managing and routing calls within the repair call center 50 and customer database 70 for storing customer data associated with callers to the repair call center. Subscriber calls are received from the call routing system 60 from the SSP central office switch 12 over the trunk circuits 30 and routed based on data stored in the customer database 70. The call routing system 60 is also functionally connected to the telephones in customer service assistant groups 91 and 92 which receiving subscriber calls routed by the call routing system 60.

In illustrative embodiments of the invention, the call management and routing functionality of the call routing system 60 may be implemented in an Automatic Call Distributor (ACD) system or a Private Branch eXchange (PBX) with ACD functionality. As known to those skilled in the art, ACDs are specialized phone systems used to manage call traffic in call centers. ACDs typically perform the following functions: recognize the calling number and answer incoming calls, and hold calls in a queue when all of the customer service assistants are busy. For example, callers to an ACD may hear a message such as "All of our customer service assistants are busy. Please hold and the next available assistant will take your call." ACDs may also be programmed to route incoming and held calls to customer service assistants.

Customer database 70 contains subscriber or customer data accessible by the call routing system 60 for routing calls to the customer service assistant groups 91 or 92. The customer data may include such information as the name and telephone number of a subscriber who has previously reported a problem to the repair call center 50. In an exemplary embodiment, customer the database 70 may be implemented in a computer linked to the call routing system 60 over a local area network (LAN) or alternatively, the functionality of customer the database 70 may be integrated within the call routing system 60.

In an alternative embodiment, the call center 50 may also include voice response unit 80 which is functionally connected to the SSP central office 12 over the trunk circuits 30. The voice response unit 80 is also functionally connected to the call routing system 60. The voice response unit 80 responds to DTMF tones (touch-tone) or spoken commands receiving touch-tone or voice commands to control the routing calls within the call routing system 60. The voice response unit 80 is also capable of generating recordings of human or synthesized voices used to play repetitive messages to a calling subscriber such as "Thank you for calling ABC telecommunications. Press or say one for the sales department. Press or say two for the repair department." In the previous example, after receiving a subscriber selection, the voice response unit 80 would send the call to the call routing system 60 for routing to the appropriate department. The operation of voice response units are known to those skilled in the art.

Having described an exemplary operating environment and the system architecture for the present invention with reference to FIGS. 1-2, a flow diagram illustrating a method 300 for routing repair calls in a repair call center is described with reference to FIGS. 1-2. For purposes of the exemplary call flow, assume, for example, that a first subscriber of telecommunications services is calling to report a new problem with customer premise equipment (hereinafter referred to as a first time caller) and a second subscriber is calling for status information on an existing problem with customer premise equipment (hereinafter referred to as a repeat caller).

Figure 3:
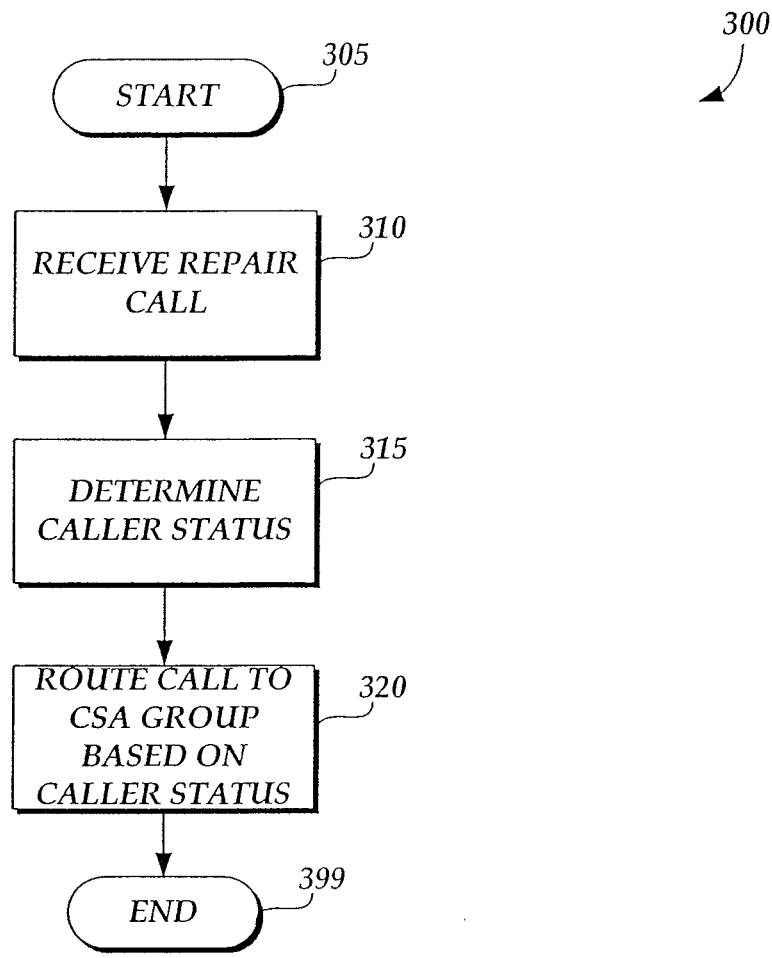
FIG. 3 is a flow diagram illustrating a method for routing repair calls in the repair call center described in FIGS. 1-2 according to an alternative embodiment of the present invention.

Referring now to FIG. 3, the method 300 begins at step 305 and continues to step 310 where call routing system 60 receives a repair call from a subscriber or calling party. At step 315, the call routing system 60 determines the status of the calling party. That is, the call routing system 60 determines whether the caller is a first time caller or a repeat caller to the repair call center. The step of determining whether the calling party is a first time caller or a repeat caller is described in detail in FIGS. 4-5 below.

After the determination of the caller status is made at step 315 the call routing system 60 routes the call CSA group 91 or 92 based on the status of the call at step 320. For example, if it is determined at step 315 that the caller is a first time caller, the call routing system 60 routes the call to an available customer service assistant in CSA group 91 if CSA group 91 has been designated to receive first time callers. If all of the customer service assistants are busy then the call routing system 60 will hold the call until an assistant in CSA group 91 becomes available. Similarly, if it is determined at step 315 that the caller is a repeat caller, the call routing system 60 routes the call to an available customer service assistant in CSA group 92 if CSA group 92 has been designated to receive repeat callers. The method then ends at step 399.

It should be understood that the many of the steps performed by the call routing system 60 may also be performed in conjunction with the voice response unit 80. For example, the voice response unit 80 may receive the repair call from the calling party and determine caller status via DTMF tones or voice commands which instruct the call routing system on how to route the repair call. The step of determining caller status within the voice response unit 80 is described in detail in FIG. 5 below.

Figure 4:
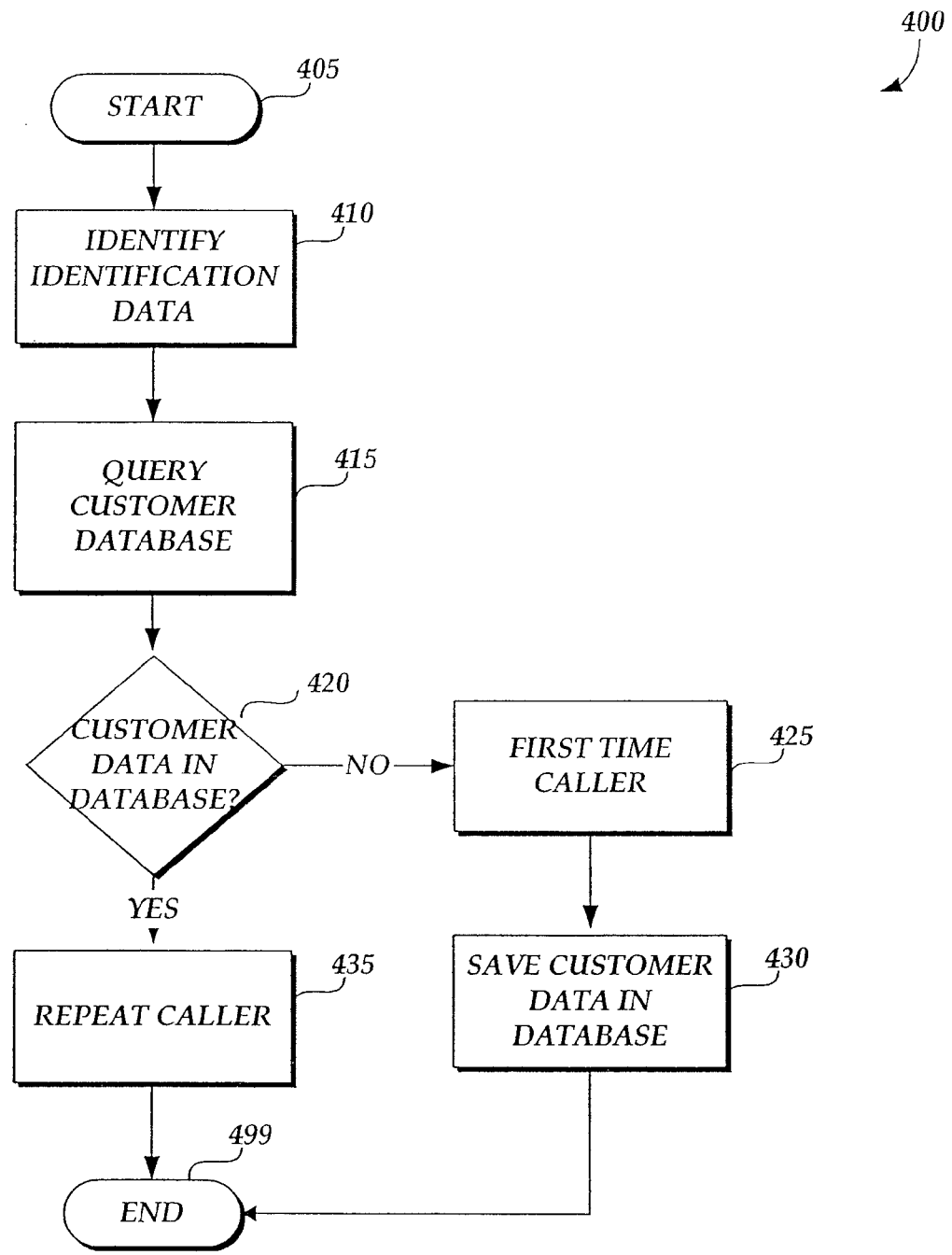
FIG. 4 is a flow diagram illustrating a method for determining the status of a calling party in the call routing method described in FIG. 3 according to an embodiment of the present invention.

FIG. 4 is a flow diagram illustrating a method 400 used by the call routing system 60 for making the determination described at step 315 of FIG. 3 as to the status of the calling party (i.e., whether the calling party to the repair call center is a first time caller or a repeat caller).

Referring now to FIG. 4, the method 400 starts at step 545 and continues to step 410 where the call routing system 60 identifies identification data associated with the calling party. The identification data may represent information provided by the telecommunications network caller ID service, such as the telephone number of the calling party.

At step 415, once the call routing system 60 has identified identification data associated with the calling party, the call routing system 60 queries customer database 70 for customer data matching the identification data. As described in the description of FIG. 2, the customer database 70 may contain the name and telephone number of subscribers who have previously reported a problem to call center 50.

At step 420, the call routing system 60 determines if the identification data matches customer data in the customer database 70. If the call routing system 60 determines that the identification data does not match any of the customer data in the customer database 70, the call routing system 60 determines that the status of the calling party is a first time caller at step 425. The call routing system 60 then routes the call to a designated CSA group (CSA group 91, for example) for receiving first time callers. The call routing system 60 may also store the identification data associated with the first time caller as new customer data in the customer database 70 at step 430.

At step 435, if call routing system 60 determines that the identification data does match customer data in the customer database 70, the call routing system 60 determines that the calling party is a repeat caller and routes the call to a designated CSA group (CSA group 92, for example) for receiving repeat callers. The method 400 then ends at step 499.

Figure 5:
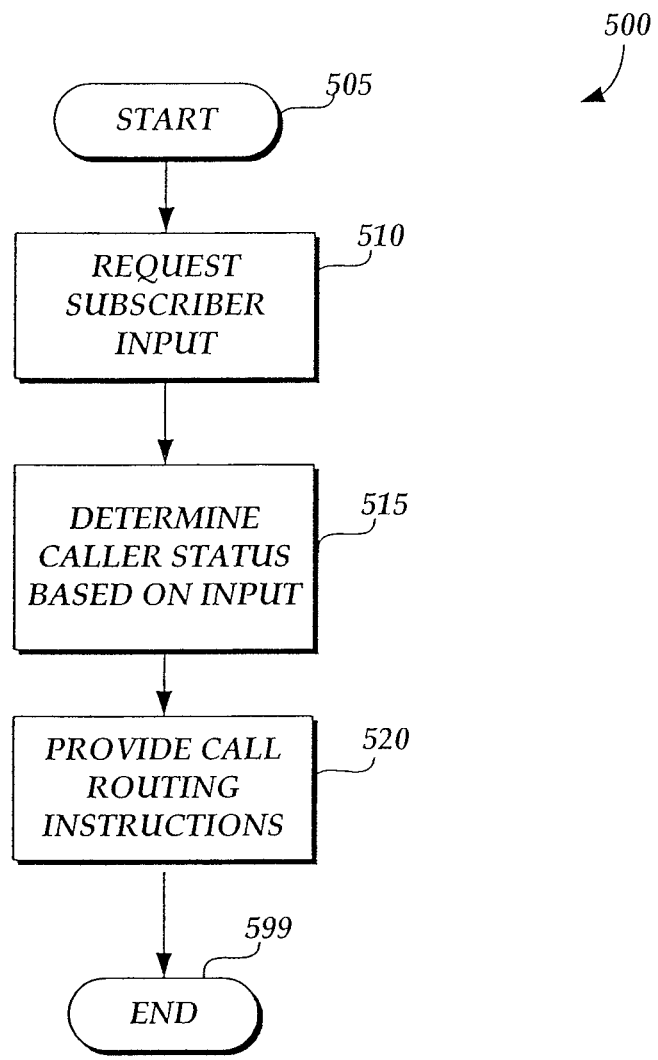
FIG. 5 is a flow diagram illustrating a method for determining the status of a calling party in the call routing method described in FIG. 3 according to an alternative embodiment of the present invention.

In accordance with an alternative embodiment, FIG. 5 is a flow diagram illustrating a method 500 used by the voice response unit 80 and the call routing system 60 for making the determination described at step 315 of FIG. 3 as to the status of the calling party.

Referring now to FIG. 5, the method 500 starts at step 505 and continues to step 510 where the voice response unit 80 requests an input in response to receiving a repair call from a calling party. The voice response unit 80 may play a prerecorded message to the caller prior to requesting the input. For example, upon receiving a repair call the voice response unit 80 may play a message such as "Welcome to XXX telecommunications repair call center. If you have previously reported a problem, please press or say 1. If this is a new call, please press or say 2."

At step 515, the voice response unit 80, after receiving the input from the calling party, determines the status of the calling party based on the input. For example, if the calling party entered a "1" in response to the prerecorded message, the voice response unit would determined that the caller is a repeat caller.

At step 520, the voice response unit 80 provides routing instructions to the call routing system 60 to route the call to the appropriate CSA group 91 or 92 based on the input. The method 520 then ends at step 599.

As described herein, a system and method are provided for the improved routing of repair calls to a call center. It will be apparent to those skilled in the art that various modifications or variations may be made in the present invention without departing from the scope or spirit of the invention. For example, the functionality of the voice module 80 may be integrated in the call routing system 60. Other embodiments of the invention will be apparent to those skilled in the art from consideration of the specification and practice of the invention disclosed herein.

What is claimed is:

1. A method for processing a communication received at a communications center over a communications network, comprising:
   determining, with a processor, whether a sender of the communication sent previous communications to the communications center based on identification information obtained from the communication, the determining including querying a database for user data matching the identification information, wherein the sender of the communication is determined to be a first time sender to the communications center when the user data does not match the identification information;
   processing the communication by generating a report by an agent from a first group of agents when it is determined that the sender did not send previous communications to the communications center and storing the identification information associated with the sender; and
   re-processing the communication by retrieving an existing service report by an agent from a second group of agents when it is determined that the sender sent previous communications to the communications center associated with the existing service report, a determination that the sender sent previous communications to the communications center being made when the identification information matches the user data, the user data associated with the existing service report and the communication being a request for status information regarding the existing service report,
   wherein the existing service report is generated based on information provided by the sender, and includes an estimated period for completing a repair,
   wherein processing the communication includes queuing the communication when no agents from the first group of agents are available to process the communication and routing the communication to an agent from the first group of agents, without any input from the sender, when the agent from the first group of agents becomes available to process the communication,
   wherein re-processing the communication includes queuing the communication when no agents from the second group of agents are available to re-process the communication and routing the communication to an agent from the second group of agents, without any input from the sender, when the agent from the second group of agents becomes available to process the communication,
   wherein the identification information provided by the sender further comprises an identifier for the sender, a communication address for the sender, and a description of a problem,
   wherein the problem relates to one of services and equipment,
   wherein the database stores the identifier for the sender, the communication address for the sender and the description of the problem,
   wherein the communication is routed based on data stored in the database,
   wherein communication management and routing functionality is implemented on a private branch exchange with automatic communication distributor functionality, and
   wherein the database is implemented on a remote computing device connected over a local area network.

2. The method according to claim 1,
   wherein agents from the first group of agents are automated.

3. The method according to claim 1,
   wherein agents from the second group of agents are automated.

4. The method according to claim 1, wherein the agent from the first group of agents comprises a voice response unit.

5. The method according to claim 1, wherein the agent from the second group of agents comprises a voice response unit.

6. A communication routing system for routing a communication received at a communications center over a communications network, the communication routing system including a processor and a memory, and determining whether a sender of the communication sent previous communications to a communications center based on identification information obtained from the communication, the determining including querying a database for user data matching the identification information, the communication routing system routing the communication to a first agent, from a first group of agents, that generates a report when it is determined that the sender did not send previous communications to the communications center and that stores the identification information associated with the sender, and the communication routing system routing the communication to a second agent, from a second group of agents, that retrieves an existing service report when it is determined that the sender sent previous communications to the communications center associated with the existing service report, a determination that the sender sent previous communications to the communications center being made when the identification information matches the user data, the user data associated with the existing service report and the communication being a request for status information regarding the existing service report, wherein the existing service report is generated based on information provided by the sender, and includes an estimated period for completing a repair, wherein the sender of the communication is determined to be a first time sender to the communications center when the user data does not match the identification information, wherein the communication is queued when no agents from the first group of agents are available to process the communication and routed to an agent from the first group of agents, without any input from the sender, when the agent from the first group of agents becomes available to process the communication, wherein the communication is queued when no agents from the second group of agents are available to re-process the communication and routed to an agent from the second group of agents, without any input from the sender, when the agent from the second group of agents becomes available to process the communication, wherein the identification information provided by the sender further comprises an identifier for the sender, a communication address for the sender, and a description of a problem, wherein the problem relates to one of services and equipment, wherein the database stores the identifier for the sender, the communication address for the sender and the description of the problem, wherein the communication is routed based on data stored in the database, wherein communication management and routing functionality of the communication routing system is implemented on a private branch exchange with automatic communication distributor functionality, and wherein the database is implemented on a remote computing device connected to the communication routing system over a local area network.

7. The system according to claim 6, wherein the identification information is obtained based on input from the sender.

8. The system according to claim 6, wherein the identification information is obtained without any input from the sender.

9. The system according to claim 6, wherein the database is integrated with the communication routing system.

10. A device for routing a communication received at a communications center over a communications network, the device including a processor and a memory, and determining whether a sender of the communication sent previous communications to a communications center based on identification information obtained from the communication, the determining including querying a database for user data matching the identification information, the device routing the communication to a first agent, from a first group of agents, that generates a report when it is determined that the sender did not send previous communications to the communications center and that stores the identification information associated with the sender, and the device routing the communication to a second agent, from a second group of agents, that retrieves an existing service report when it is determined that the sender sent previous communications to the communications center associated with the existing service report, a determination that the sender sent previous communications to the communications center being made when the identification information matches the user data, the user data associated with the existing service report and the communication being a request for status information regarding the existing service report, wherein the identification information is obtained without any input from the sender, and wherein the existing service report is generated based on information provided by the sender, and includes an estimated period for completing a repair, wherein the sender of the communication is determined to be a first time sender to the communications center when the user data does not match the identification information, wherein the communication is queued when no agents from the first group of agents are available to process the communication and routed to an agent from the first group of agents, without any input from the sender, when the agent from the first group of agents becomes available to process the communication, wherein the communication is queued when no agents from the second group of agents are available to re-process the communication and routed to an agent from the second group of agents, without any input from the sender, when the agent from the second group of agents becomes available to process the communication, wherein the identification information provided by the sender further comprises an identifier for the sender, a communication address for the sender, and a description of a problem, wherein the problem relates to one of services and equipment, wherein the database stores the identifier for the sender, the communication address for the sender and the description of the problem, wherein the communication is routed based on data stored in the database, wherein communication management and routing functionality is implemented on a private branch exchange with automatic communication distributor functionality, and wherein the database is implemented on a remote computing device connected over a local area network.

* * * * *